Oct. 9, 1928.  
H. RUEGG  
1,687,107  
SAFETY DEVICE FOR MACHINE CONTROL.  
Filed April 4, 1927
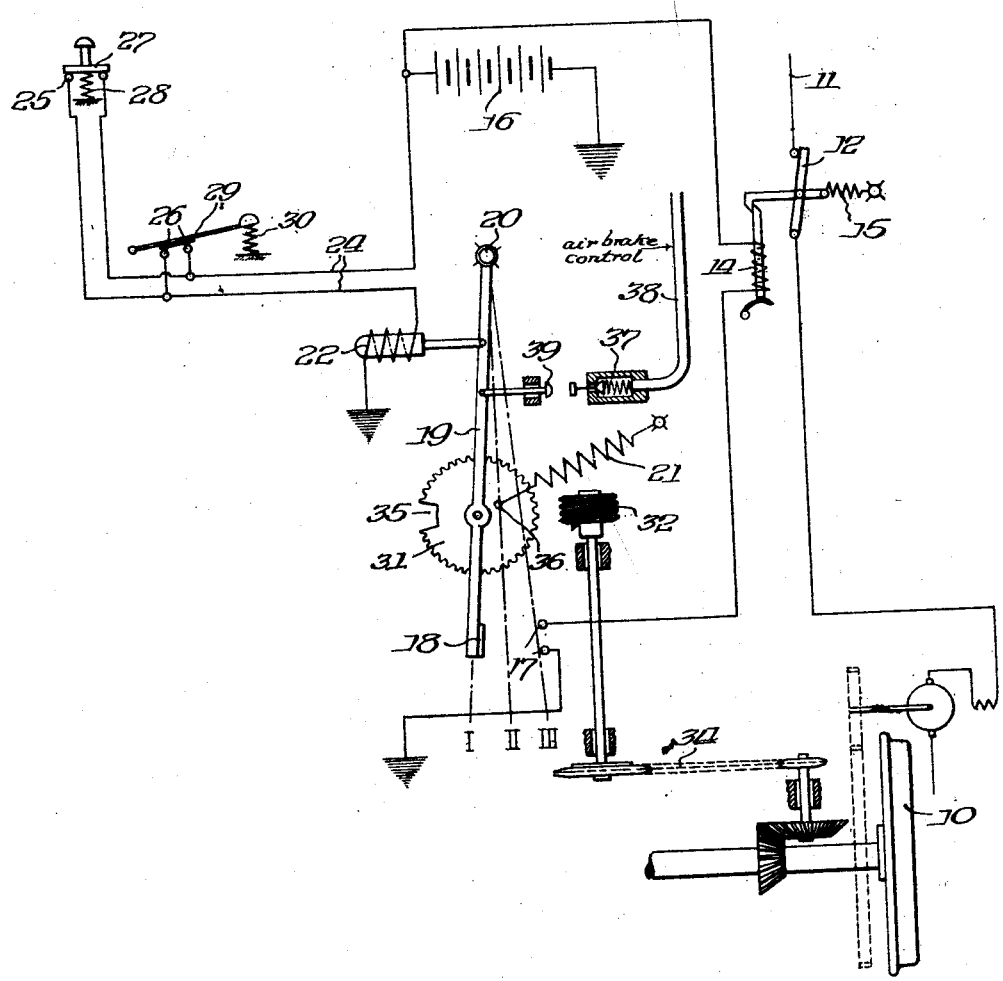
Witness:  
Inventor  
Henri Ruegg Patented Oct. 9, 1928.

1,687,107

UNITED STATES PATENT OFFICE.

HENRI RUEGG, OF ZURICH, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND.

SAFETY DEVICE FOR MACHINE CONTROL.

Application filed April 4, 1927, Serial No. 180,982, and in Switzerland April 14, 1926.

This invention relates to safety apparatus for control of electrically operated machines, and while susceptible of use in connection with the control of a large variety of different sorts of machines, it is of particular utility in the control of the operation of electric cars or trains.

The general object of the invention is to provide automatically operating means which will bring the controlled machine to a stop, after a predetermined interval, in the event of disablement of or inattention on the part of the operator.

Another object is the provision of apparatus of this sort which is simple in construction and certain in operation.

A specific object is the provision of apparatus of this sort which is adapted to be put into operation automatically and which operates with a predetermined delay period between the tripping time and the time when it becomes effective on the controlled machine, so as to permit the operator to surrender control for a limited time.

Other and further objects of the invention will be pointed out or indicated hereinafter, or will appear to one skilled in the art upon an understanding of the invention or its employment in practice.

In the drawing forming a part of this specification, I illustrate in diagrammatic fashion one organization of apparatus in which the invention may be embodied, but it is to be understood that this is presented for purpose of illustration only and that the claims are not to be construed as limited to this particular arrangement of parts or the details thereof.

In the drawing, the figure is a diagrammatic illustration of an automatic safety control apparatus adapted to effect the opening of a control switch for an electric machine, such as a motor, and to operate auxiliary apparatus for braking the machine.

For purpose of explanation, the arrangement of apparatus here illustrated will be described as applied to an electric car or locomotive. For purpose of safety in the operation of various machines, such as electric cars, cranes or the like, in which it is important that control of the machine's operation be maintained at all times, it is sometimes desirable to provide for the automatic stopping of the machine in the event of disablement or inattention on the part of the operator in control thereof. In some instances, however, it may be desirable to permit the operator to surrender control of the safety apparatus in order to direct his activity, momentarily, to some ancillary duty. The permissible period, during which the operator may thus surrender control with safety, may vary, however, depending on the speed at which the machine is operating at the time. The present invention permits the operator this desirable latitude, with the ultimate certainty that the operation of the machine will be stopped automatically in the event the period of inattention is prolonged beyond a certain point in the operation of the machine.

Referring to the illustrative arrangement shown in the drawing, let it be understood that the reference numeral 10 designates an operating part of the machine, in the present instance, a traction wheel of an electric car or locomotive, which is driven by a suitable motor supplied from a power line 11 by way of a control switch 12. Under normal operation of the machine, this control switch is held closed by a tripping device 14 which is operated electromagnetically to trip the switch and permit it to be opened by its spring 15. The electromagnetic device 14 is arranged to be energized from appropriate source 16 when the energizing circuit is closed across switch terminals 17. A switch 18 is operable to close the tripping circuit and said switch is carried on a switch lever 19 pivoted at 20, which lever is automatically held retracted against the tension of the spring 21, by an electromagnetic device 22 which, when de-energized, surrenders control of the lever to the spring 21. The electromagnetic device 22 is energized from the source 16 through a control circuit 24, so long as said control circuit is closed as at the terminals 25 or at the terminals 26. A control switch 27 is arranged to close the circuit across the terminals 25, said switch opening automatically by a spring 28. The switch 27 may be embodied in the form of a push button contained in the handle of a controller lever and requiring the continued pressure of the operator's hand to maintain it in the closed position against the pressure of the spring 28. At the terminals 26 is another control switch 29 which opens automatically by its spring 30, and this switch may be arranged on the platform occupied by the operator, to be held closed by pressure of the operator's foot. The lever 19 has rotatably mounted thereon a pinion or worm wheel 31 adapted for cooperation with a worm 32 which is operably connected, as by means of the sprocket and chain connection 34, with the traction wheel 10. The radius of the pinion 31 is such that when the lever is released by de-energization of the electromagnetic device 22, the lever will be moved from the position I to the position II and arrested in the latter position by the contact of the pinion with the worm 32. The pinion 31 contains a notch or dwell 35 of suitable size to receive the worm 32 and permit the lever to swing to the position III in which position the tripping circuit is closed across the terminals 17 by the switch 18. This will occur if the pinion 31 has been rotated, by virtue of its meshing engagement with the worm 32, to an extent such as to bring the dwell 35 around to the worm. The arrangement provides, therefore, for a certain time lapse between the instant when the electromagnetic device 22 is de-energized and the instant when the tripping circuit will be closed by the switch 18 to energize the tripping device 14 and trip the switch 12. This permits the operator to surrender control of the control switches 27 and 29 for a limited period, without occasioning the stopping of the machine. If either of the control switches is closed before the dwell 35 receives the worm 32, the electromagnetic device 22 will be re-energized, and the lever 19 retracted from position II to position I whereupon the spring 21, by virtue of its connection at the eccentric point 36, will restore the pinion 31 to its original rotational position. It will be apparent from the foregoing that the period during which the operator may surrender control of the switches 27 and 29 depends upon the speed at which the machine is operating, as the speed at which the pinion 31 will be rotated is proportional to the operating speed of the machine. An arrangement is shown whereby the lever 19 may accomplish the operation of a braking device for bringing the machine to a standstill after the power has been cut off by the opening of switch 12. This includes a valve 37 which controls an air brake control line 38, which valve may be opened by a plunger 39, carried by lever 19, as the lever 19 reaches position III.

What I claim is:

1. Control apparatus comprising, in combination with the controlled machine, a switch controlling power in-put to the machine, switch means for effecting controlling movement of said control switch, a trip device for actuating said switch means and comprising a plurality of parts, means for operating said trip device, and control apparatus for controlling operative connection and disconnection of the trip device and said operating means therefor, said control apparatus tending normally to maintain operative connection of the trip device and said operating means therefor and requiring restraint by an operator to keep them disconnected, certain of the parts comprising said trip device being carried by said switch means.

2. In safety control apparatus, the combination with the controlled machine, of a switch controlling power in-put to the machine, switch means for effecting controlling movement of said control switch, spring means urging said switch means into operating position, a trip device operable by the machine and movable into and out of connecting relation therewith, control apparatus for automatically effecting movement of the trip device into connecting relation with said machine, and manually-operable means associated with said control apparatus for effecting movement of the trip device out of connecting relation with said machine, said trip device being operable to constrain said spring means against functioning for a predetermined period of time after moving into connecting relation with said machine.

3. In control apparatus, a movable control switch member, a worm, means for driving said worm, a worm wheel rotatably carried by said member for movement therewith into and out of operating relation with said worm and being provided with a peripheral notch for receiving the latter, means acting normally to move said member toward said worm, manually-controlled means for effecting movement of said member away from said worm, and switch means arranged for cooperating engagement with said switch member when the latter is in position with said worm disposed within said notch.

4. In apparatus for controlling a machine, means for controlling the power supply to said machine, movably-supported means having an initial and a final position and being operable when in the final position to effect controlling movement of said controlling means; and means associated with said movably-supported means and being operable to permit of movement thereof from its initial position to an intermediate position, to hold said movably-supported means in said intermediate position for a predetermined period of time, and to subsequently permit of further movement of said movably-supported means from said intermediate position to said final and operating position thereof.

5. In apparatus for controlling a machine, means for controlling the power supply to said machine, movably-supported means having an initial and a final position and being operable when in the final position to effect controlling movement of said controlling means; and means associated with said movably-supported means and being operable to permit of movement thereof from its initial position to an intermediate positon, to hold said movably-supported means in said intermediate position for a predetermined period of time, and to subsequently permit of further movement of said movably-supported means from said intermediate position to said final and operating position thereof; said last-named means including a worm, means providing a driving connection between said worm and said machine, and a worm wheel rotatably carried by said movably-supported means for coaction with said worm and provided with a peripheral notch for receiving the same subsequent to rotation of said worm wheel by said worm for said predetermined period of time.

In testimony whereof I have hereunto subscribed my name this 16 day of March, A. D. 1927, at Zurich, Switzerland.

HENRI RUEGG.